3,485,803
ORGANOMETALLIC POLYAMIDES
Pierre Mazerolles, Toulouse, France, assignor to Etablissement Public: Centre National de la Recherche Scientifique, Quai Anatole, Paris, France, a corporation of France
No Drawing. Filed Sept. 30, 1965, Ser. No. 491,819
Claims priority, application France, Oct. 1, 1964, 990,035
Int. Cl. C08g 20/20
U.S. Cl. 260—78                                            7 Claims

ABSTRACT OF THE DISCLOSURE

Novel linear organometallic polyamides of the formula $$\ldots -NH-(CH_2)_n-\underset{R}{\overset{R}{M}}-(CH_2)_n-NH-CO-(CH_2)_{n'}-\underset{R'}{\overset{R'}{M'}}-(CH_2)_{n'}-CO-\ldots$$

in which $n$ and $n'$ are numbers greater than 3 (which may be the same or different); R and R' are radicals with saturated chains (which may be the same or different) or radicals with unsaturated or branched chains; M and M' are silicon or germanium; and either $$-\underset{R}{\overset{R}{M}}- \text{ or } -\underset{R'}{\overset{R'}{M'}}-$$

may be $-CH_2-$, are heat-resistant solids.

---

The present invention relates to linear organometallic polyamides containing the recurring structural units:

$$\ldots -CO-NH-(CH_2)_n-\underset{R}{\overset{R}{M}}-(CH_2)_n-NH-CO-(CH_2)_{n'}-\underset{R'}{\overset{R}{M'}}-(CH_2)_{n'}\ldots$$

in which $n$ and $n'$ are numbers greater than 3 which may be the same or different; R and R' are radicals with saturated chains which may be the same or different, such as $CH_3$, $CH_3-CH_2-$, or radicals with unsaturated or branched chains; M and M' represent silicon or germanium and may be the same or different, and the groups $$-\underset{R}{\overset{R}{M}}- \text{ or } -\underset{R'}{\overset{R'}{M'}}-$$

can represent $CH_2-$.

The invention is likewise concerned with a process for preparing said polyamides, which can be regarded as a process of synthesizing organometallic polyamides.

The invention also concerns the industrial applications of the above-mentioned organometallic polyamides, particularly for forming heat resistant polymeric elements.

The process of synthesis of the linear organometallic polyamides according to the invention consists principally in heating for two to three hours in a closed vessel and in an inert atmosphere at a temperature between 150 and 250° C. at ordinary pressure, optically in the presence of a catalyst, an equimolecular mixture of an acid $$R_2M[(CH_2)_4COOH]_2$$

or of an amine $$R_2M[(CH_2)_4CH_2NH_2]_2$$

respectively with an amine or a homologous higher diacid, for example $R_2M[(CH_2)_{n_1}NH_2]_2$, $NH_2(CH_2)_{n_1}NH_2$, $R_2M[(CH_2)_{n_1}COOH]_2$, $COOH(CH_2)_{n_1}COOH$; R and M having the same meanings and values as stated above, $n_1$ having the values indicated below.

The diamines and diacids (used for carrying out the process of the present invention for obtaining linear organometallic polyamides) are obtained, according to another feature of the invention, by synthesis:

When M is silicon, from dimethyl dichlorosilane and tetrahydrofuran when $n_1=4$, from tetrahydropyran when $n_1=5$ or from glycols when $n_1=6$ or more, When M is germanium, from germanium tetrachloride and tetrahydrofuran when $n_1=4$, from tetrahydropyran when $n_1=5$ or from glycols when $n_1=6$ or more.

All the starting products are articles of commerce or are easily obtained.

The latter synthesis consists, starting from the appropriate materials, in forming a pyranyl glycol containing M, heating this glycol to 250° C. in the presence of phosphoric acid to remove the pyranyl group, reacting the resulting glycol at 0° C. with phosphorus tribromide giving the corresponding dibromide of the metal, reacting the latter dibromide with potassium cyanide in alcohol and thus obtaining the dinitrile which may be either hydrogenated at ordinary temperature in the presence of Raney nickel to give the diamine $R_2M[(CH_2)_nCH_2NH_2]_2$, or hydrolysed by glycolic potash and then treated with hydrochloric acid to give the diacid $R_2M[(CH_2)_nCOOH]_2$. The said synthesis of the diacids and diamines may be expressed schematically as follows:

$$R_4M$$
$$\downarrow$$
$$R_2MX_2 \quad ((CH_3)_2SiCl_2 \text{ is a commercial product})$$
$$\downarrow \quad ClMg(CH_2)_n-O-Pyr.$$
$$R_2M[(CH_2)_nOH]_2$$
$$\downarrow \quad PBr_3 \text{ or } SOCl_2$$
$$R_2M[(CH_2)_nX]_2 \qquad X=Br \text{ or } Cl$$
$$\downarrow \quad KCN + CuCN$$
$$R_2M[(CH_2)_n-CN]_2$$
$$H_2(Ni) \swarrow \qquad \searrow KOH, \text{ THEN } HCl$$
$$R_2M[(CH_2)_n-CH_2-NH_2]_2 \qquad R_2M[(CH_2)_nCOOH]_2$$
$$\searrow \qquad \swarrow$$
$$\text{POLYAMIDES}$$

In the case of silicon, the pyranyl glycol is obtained in the following manner:

(a) Synthesis of $(CH_3)_2Si[(CH_2)_nCOOH]_2$ and $(CH_3)_2Si[(CH_2)_nCH_2NH_2]_2$.

Tetrahydrofuran is treated with hydrochloric acid or acetyl chloride, leading to the chlorhydrin of tetramethylene glycol (Staar and Hixon, J. Am. Chem. Soc. 1934, 56, 1595; H. Normant and Voreux, Bull. Soc. Chim. 1950, 5–6, 420) according to the reaction;

(1)

$$\underset{\underset{O}{\diagdown \diagup}}{\overset{CH_2-CH_2}{\underset{CH_2 \quad CH_2}{| \quad |}}} + HCl \longrightarrow$$

$$OHCH_2-CH_2-CH_2-CH_2ClOH(CH_2)_4Cl$$

Dihydropyran is reacted on this chlorhydrin, which blocks the alcohol function (Chem. Abs. 1951, 45, 5725;

U.S. Patent No. 2,541,747; C. Crisan, Theses Paris page 5, 1956):

(2)
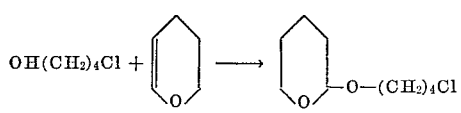

This pyranyl derivative obtained attacks magnesium in a tetrahydrofuran medium:

(3)
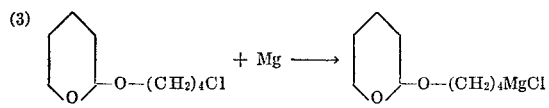

One can then react dimethyl chlorosilane on an excess of this organomagnesium compound and obtain the pyranyl glycol containing silicon:

(4)
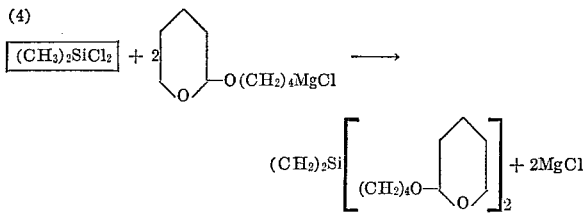

The sequence of the reactions of the synthesis according to the invention are thus as follows:

By heating to 250° C. in the presence of phosphoric acid, the pyranyl group is removed:

(5)
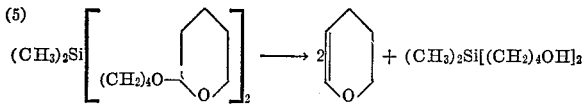

The action of the phosphorus tribromide at 0° C. on the glycol leads to the dibromide:

(6)  $3(CH_3)_2Si[(CH_2)_4OH]_2 + 2PBr_3 \rightarrow$
$2P(OH)_3 + 3(CH_3)_2Si[(CH_2)_4Br]_2$ The dibromide reacts quantitatively on the potassium cyanide in alcohol:

(7)  $(CH_3)_2Si[(CH_2)_4Br]_2 + 2KCN \rightarrow$
$(CH_3)_2Si[(CH_2)_4CN]_2 + 2KBr$ The dinitrile can be hydrogenated under ordinary pressure in the presence of Raney nickel (8)
$(CH_3)_2Si[(CH_2)_4CN]_2 + 4H_2 \longrightarrow$ 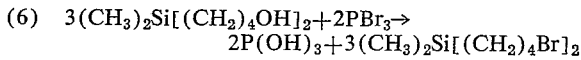

By hydrolysis of the nitrile (glycol potash) the diacid is obtained:

(9)
$(CH_3)_2Si[(CH_2)_4CN]_2 + 2KOH + 2OH_2 \longrightarrow$
$(CH_3)_2Si[(CH_2)_4COOK]_2 + 2NH_3$

(10)
$(CH_3)_2Si[(CH_2)_4COOK]_2 + 2HCl \longrightarrow$
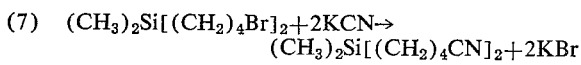 $+ 2KCl$ (b) Synthesis of the acids $(CH_3)_2Si[(CH_2)_nCOOH]_2$ and the amines $(CH_3)_2Si[(CH_2)_nCH_2NH_2]_2$ in which $n$ is greater than or equal to 5. Reactions 2 to 10 above remain the same; when $n$ is 5, one starts from tetrahydropyran and acetyl chloride

 $+ CH_3COCl \longrightarrow CH_3COO(CH_2)_5Cl$ which, by transesterification, gives the $C_5$ chlorohydrin $CH_3COO(CH_2)_5Cl + HCH_2OH \rightarrow$
$CH_3COOCH_3 + OH(CH_2)_5Cl$ (Fusari, Greenlee et Brown, J. Amer. Oil Chem. Soc. 28, 1951, 416).

When $n$ is greater than 5 the action of hydrochloric acid in the hot is used on the corresponding glycol, with continuous extraction with petroleum ether:

$OH(CH_2)_nOH + HCl \rightarrow OH_2 + OH(CH_2)_nCl$

The pyranyl group is then removed from this chlorohydrin, with blocking of the alcohol function. As a blocking agent, one can use for example dihydropyran, isobutylene and the like.

In the case of germanium, germanium tetrachloride is reacted on an excess of ethyl magnesium bromide and the tetraethylgermane is obtained:

(1″)
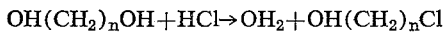 $+ 4C_2H_5MgBr \longrightarrow (C_2H_5)_4Ge + 2MgCl_2 + 2MgBr_2$

By reacting bromide in the dark in the presence of aluminum bromide as catalyst, one obtains dibromodiethylgermane:

(2″)  $(C_2H_5)_4Ge + 2Br_2 \rightarrow (C_2H_5)_2GeBr_2 + 2C_2H_5Br$

The crude dibromide is transformed by hydrolysis into the oxide, easily purifiable by distillation; the pure oxide is then transformed into the pure dibromide by the action of 48% HBr. The sequence of the synthesis reactions according to the invention is in the case as follows, similar to that indicated above for silicon; namely, dibromodiethylgermane $(C_2H_5)_2GeBr_2$ reacts on the pyranyl magnesium compound like the dimethyldichlorosilane:

(4′)
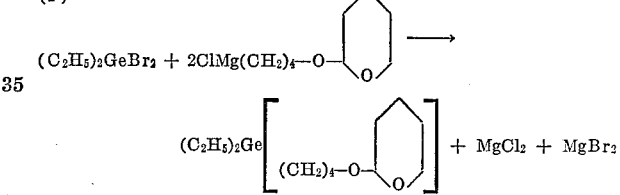

The following reactions are identical to those which have been described above for the silicon derivatives.

(5′)
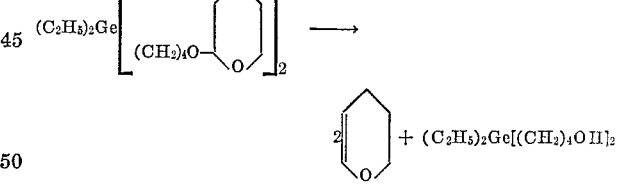

(6′)
$3(C_2H_5)_2Ge[(CH_2)_4]_2OH]_2 + 2PBr_3 \longrightarrow$
$2P(OH)_3 + 3(C_2H_5)_2Ge[(CH_2)_4Br]_2$ (7′)
$(C_2H_5)_2Ge[(CH_2)_4Br]_2 + 2KCN \longrightarrow$
$(C_2H_5)_2Ge[(CH_2)_4CN]_2 + KBr$ (8′)
$(C_2H_5)_2Ge[(CH_2)_4CN]_2 + 4H_2 \longrightarrow$ 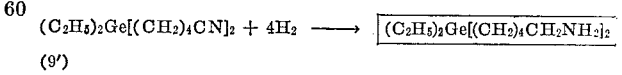

(9′)
$(C_2H_5)_2Ge[(CH_2)_4CN]_2 + 2KOH + 2OH_2 \longrightarrow$
$(C_2H_5)_2Ge[(CH_2)_4COOK]_2 + 2NH_3$ (10′)
$(C_2H_5)_2Ge[(CH_2)_4COOK]_2 + 2HCl \longrightarrow$
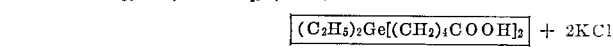 $+ 2KCl$ Two examples of carrying out the invention are given below.

EXAMPLE 1

Chlorobutanol-1 is first prepared according to the method described in "Syntheses Organiques" (Masson et Cie, Paris; II, 1949, p. 242), by keeping the fraction which distills, at the second distillation at 84.5–85° C. under 15 mm. mercury pressure.

Pyranyl derivative of chlorobutanol

In an Erlenmeyer flask of 1000 cubic centimetres capacity, there are placed 217 grams of chlorobutanol and a magnetic bar. There are then added dropwise while stirring, 190 grams of dihydropyran while cooling with an ice bath in such a way as to maintain the inner temperature at about 20° C. After two hours stirring a few grams of sodium bicarbonate are added; after standing overnight, the liquid is filtered and distilled under reduced pressure. 291 grams are recovered of the pyranyl derivative of chlorobutanol (B.P. at 2 mm. mercury=95° C. Yield=76%).

82 grams of dibromodiethylgermanium are added to the solution of magnesium prepared by starting from 2 grams of ethyl bromide, 142 grams of pyranyl chlorobutanol and 20 grams of magnesium in 500 cubic centimetres of tetrahydrofuran. After boiling for ten hours the cooled mixture is treated with water and the organic layer is dried and distilled. When the solvent has been driven off, the two grams of phosphoric acid are added to the residue and gradually heated to 230° C. under about 100 mm. Hg pressure; the dihydropyran liberated is freely given off.

Weight of glycol obtained: 66.405 grams. Yield=84%. B.P. 2 mm.=166°; $n_D^{20}$=1.4872; $d_4^{20}$=1.1050; $RM_D$ Calc.: 72. Found 72.1.

Analysis.—$C_{12}H_{28}O_2Ge$, calc.: C, 52.04%; H, 10.19%; Ge, 26.21%. Found: 52.04%; H, 9.93%; Ge 26.5%.

56 grams (0.202 mole) of this glycol are treated at 0° C. with 40.632 grams (0.150 mole) of $PBr_3$ in solution in 60 cubic centimetres of dry heptane. After standing overnight, the mixture is hydrolysed and the aqueous layer is decanted off. The organic phase is dried over sodium sulphate and distilled. 28.68 grams are obtained of the pure dibromo derivative. Yield=25%. The infra-red spectrum of the product contains no absorption bands in the region of 3300 cm.$^{-1}$. B.P. 1 mm.=145°; $n_D^{20}$=1.5115; $d_4^{20}$=1.4298; $RM_D$ calc.: 84.9. Found: 84.5.

Analysis.—$C_{12}H_{26}Br_2Ge$, calc.: C, 35.78%; H, 6.51%; Br, 39.68%. Found: C, 35.82%; H, 6.46%; Br, 39.70%.

A residue remains which cannot be distilled and which decomposes on heating, giving light products (B.P.$_{.11\ mm.}$=95° C. and B.P.$_{.11\ mm.}$=151° C.) of ethylenic nature. (Intense band towards 1640 centimetres to the −1 cm.$^{-1}$, in the infra-red spectrum.)

A mixture is boiled for 5 hours containing 26.711 grams of this dibromide, 15 grams of potassium cyanide, 0.5 gram of cuprous chloride, 250 cubic centimetres of 95° alcohol and 29 cubic centimetres of water. The potassium bromide is filtered, the solvent is driven off under vacuum and the residue is extracted with chloroform and then distilled. 18.785 grams of the dinitrile are recovered. Yield=96%. B.P. 0.4 mm.=165°; $n_D^{20}$=1.4777; $d_4^{20}$=1.0690; $RM_D$ calc.: 78. Found: 78.1.

Analysis.—$C_{14}H_{26}N_2Ge$, calc.: C, 57.00%; H, 8.88%; N, 9.50%. Found: C, 57.11%; H, 8.96%; N, 9.22%.

14.824 grams of the dinitrile obtained in solution in 70 cubic centimetres of 95° alcohol saturated with ammonia, are stirred in an atmosphere of hydrogen in the presence of 5 grams of Raney nickel. The hydrogen absorption is slow and it is necessary to add catalyst several times. When the absorption has ended, the liquid is filtered and distilled. 12.837 grams of the diamine are obtained $(C_2H_5)_2Ge[(CH_2)_4CH_2NH_2]_2$. Yields=84%. B.P.$_{.0.3\ mm.}$=127°; $n_D^{20}$=1.4835; $d_4^{20}$=1.0153; $RM_D$ calc.: 85.6. Found: 85.3.

Analysis.—$C_{14}H_{34}N_2Ge$, calc.: C, 55.49%; 11.31%; N, 9.25%. Found: C, 55.41%; H, 11.25%; N, 9.76%.

Infra-red spectrum: no trace of the band C—N towards 2250 cm.$^{-1}$.

A mixture containing 52.162 grams of the above-mentioned dinitrile, 60 grams of potash, 35 grams of water and 500 grams of glycol are brought to the boil for 48 hours. After cooling, the liquid is washed with ether to remove organic impurities, then acidified by pouring in 60 grams of hydrochloric acid ($d$=1.19) diluted in 100 grams of water. The diacid which precipitates is extracted with ether. By distillation one recovers 55.975 grams of the product. Yield=61%. B.P.$_{.0.02\ mm.}$=163–165°; $n_D^{20}$=1.4830; $d_4^{20}$=1.1666; $RM_D$ calc.: 82.1. Found: 81.5.

Analysis.—$C_{14}H_{28}O_4Ge$, calc.: C, 50.50%; H, 8.48%; Ge, 21.80%. Found: C, 50.49%; H, 8.42%; Ge, 22.1%.

Equimolecular quantities of $$(C_2H_5)_2Ge[(CH_2)_4CH_2NH_2]_2$$

and $$(C_2H_5)_2Ge[(CH_2)_4COOH]_2$$

are mixed together. The mixture is heated to 200° C. for 3 hours to obtain the germano-organic polyamide of the recurring unit formula:

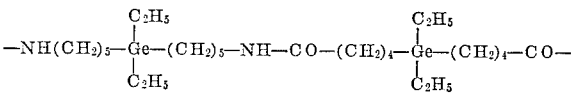

EXAMPLE 2

By reacting 60.0 grams (0.465 mole) of dimethyldichlorosilane on the solution of the magnesium compound prepared by starting from 31 grams of magnesium, 2 grams of ethyl bromide and 231 grams of pyranyl chlorobutanol in 500 cubic centimetres of tetrahydrofuran, after the customary treatment 50.072 grams are obtained of the glycol $(CH_3)_2Si[(CH_2)_4OH]_2$. Yield=53%. B.P.$_{.0.3}$=135°; $n_D^{20}$=1.4681; $d_4^{20}$=0.9324; $RM_D$ calc.: 60.0. Found: 60.9.

Analysis.—$C_{10}H_{24}SiO_2$, calc.: C, 58.77%; H, 11.84%; Si, 13.73%. Found: C, 58.84%; H, 11.78%; Si, 13.2%.

30.088 grams (0.111 mole) of $PBr_3$ are added dropwise to 30.669 grams (0.150 mole) of the diol obtained, in solution in 60 cubic centimetres of ethyl bromide while cooling so as to maintain the inner temperature at about 0° C. After standing over night, hydrolysis and the usual treatments, 16.238 grams are recovered of the dibromo derivative $(CH_3)_2Si[(CH_2)_4Br]_2$. Yield=33%. B.P.$_{.0.4}$=119°; $n_D^{20}$=1.4966; $d_4^{20}$=1.3141; $RM_D$ calc.: 73.3. Found: 73.5.

Analysis.—$C_{10}H_{22}Br_2Si$, calc.: C, 36.38%; H, 6.72%; Br, 48.41%. Found: C, 36.42%; H, 6.71%; Br, 48.37%.

A mixture containing 54.003 grams of this dibromide, 37 grams of potassium cyanide, 60 cubic centimetres of water, 680 cubic centimetres of 95° alcohol and 0.5 gram of cuprous chloride are heated for 12 hours. After filtering the potassium bromide, the alcohol is driven off under vacuum; the residue is extracted with ether and distilled at the pump.

Weight obtained 29.172 grams. Yield=80% of $(CH_3)_2Si[(CH_2)_4CN]_2$. B.P.$_{.0.3}$=154°; $n_D^{20}$=1.4592; $d_4^{20}$=0.9083; $RM_D$ calc.: 66.8. Found: 66.9.

Analysis.—$C_{12}H_{22}N_2Si$, calc.: C, 64.81%; H, 9.97%; N, 12.60%. Found: C, 64.87%; H, 9.91%; N, 13.20%.

12.110 grams of this dinitrile in solution in 60 cubic centimetres of 95° alcohol saturated with ammonia are stirred in an atmosphere of hydrogen in the presence of 5 grams of Raney nickel. The absorption is slow and it is necessary to add catalyst several times. The liquid is filtered through a sintered disc and distilled under vacuum to provide 10.193 grams of diamine. Yield=81%.

$$(CH_3)_2Si[(CH_2)_4CH_2NH_2]_2$$

B.P.$_{.0.2}$=104°; $n_D^{20}$=1.4682; $d_4^{20}$=0.8630; $RM_D$ calc.: 74.0. Found: 74.2.

Infra-red spectrum: no trace of the band C≡N towards 2250 cm.$^{-1}$.

*Analysis.*—C$_{12}$H$_{30}$N$_2$Si, calc.: C, 62.54%; H, 13.12%; N, 12.16%. Found: 62.70%; H, 13.23%; N, 12.17%.

A mixture containing 13.587 grams of the latter dinitrile, 20 grams of potash, 10 grams of water and 150 grams of glycol is brought to the boil for 60 hours. After 60 hours of refluxing, the evolution of ammonia is no longer observed. The glycol is driven off under vacuum and the residue is dissolved in 300 grams of distilled water. After washing with ether to remove the traces of the organic impurities, the aqueous solution is acidified by the addition of 38 grams of hydrochloric acid, $d=1.19$. The precipitated diacid is extracted with ether; the ethereal solution, dried over sodium sulphate, distils to give 12.569 grams of the diacid $$(CH_3)_2Si[(CH_2)_4COOH]_2$$

Yield=79%. M.P.=37–38°; B.P.$_{.0.3}$=152°; $n_D{}^{35}$=1.4622; $d_4{}^{35}$=1.0156; RM$_D$ calc.: 70.5. Found: 70.5.

*Analysis.*—C$_{12}$H$_{24}$O$_4$Si, calc.: C, 55.35%; H, 9.29%; Si, 10.78%. Found: C, 55.36%; H, 9.16%; Si, 10.8%.

Equimolecular quantities of $$(CH_3)_2Si[(CH_2)_4CH_2NH_2]_2$$

(2.303 grams or 0.01 mole) and of $$(CH_3)_2Si[(CH_2)_4COOH]_2$$

(2.604 grams or 0.01 mole) are mixed together; the mixture is heated for 2 hours on a paraffin bath at 200° C. The water vapour is freely evolved and condensed in the cold part of the tube. The mixture becomes very viscous and solidifies on cooling. The silico-organic polyamide is obtained of the formula

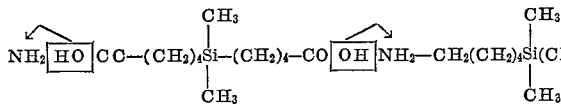

which corresponds to the recurring unit formula

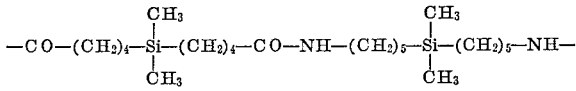

The polyamides according to the invention are of interest as heat resistant polymers. They can be used among other things for the fabrication of joints, textile fibres and so forth.

EXAMPLE 3

87.31 grams (0.3 mole) of dibromodiethylgermanium were slowly added to a solution of magnesium organo compound prepared by starting from 2 grams of ethyl bromide, 200 grams (0.967 mole) of pyranyl derivative of chloropentanol and 26 grams (1.07 mole) of magnesium in 500 cc. of tetrahydrofuran (THF). The mixture was added under reflux and the excess of magnesium compound was hydrolysed. The organic phase was decanted, extracted by means of petroleum ether, dried on calcium chloride and concentrated. After cooling 2 grams of phosphoric acid were added to the residue which was then gradually heated to 230° C. under 100 ml./Hg. The dihydropyran liberated then distilled off, and 77.9 grams of 6,6-diethyl - 6 - germano-undecane - 1,11 - diol, (C$_2$H$_5$)$_2$Ge[(CH$_2$)$_5$OH]$_2$ were recovered. B.P.$_{0.05\text{ mm.}}$=165° C. Yield 85%.

A mixture of 51 grams (0.167 mole) of said diol and 190 grams of 48% hydrobromic acid was heated and stirred during 4 hours. After cooling the organic phase was extracted with petroleum ether, dried and distilled. 47.9 grams of 6,6-diethyl - 6 - germano - 1,11 - dibromo-undecane, (C$_2$H$_5$)$_2$Ge[(CH$_2$)$_5$Br]$_2$ were recovered. B.P.$_{.1\text{ mm.}}$=169° C. Yield 66%.

Starting from this dibromo compound, the corresponding diamine (C$_2$H$_5$)$_2$Ge[(CH$_2$)$_5$CH$_2$NH$_2$]$_2$ and diacid (C$_2$H$_5$)$_2$Ge[(CH$_2$)$_5$COOH]$_2$ were obtained according to the same process as described in Example 1, Equimolecular quantities of said diacid and diamine were mixed together and heated to 200° C. for 2 hours to obtain the germano-organic polyamide of the formula:

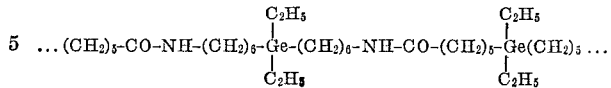

EXAMPLE 4

87.31 grams (0.3 mole) of dibromodiethylgermanium were slowly added to a solution of magnesium organo compound prepared by starting from 2 grams of ethyl bromide, 200 grams (0.967 mole) of pyranyl derivative of chloropentanol and 26 grams (1.07 mole) of magnesium in 500 cc. of tetrahydrofuran (THF). The mixture was added under reflux and the excess of magnesium compound was hydrolysed. The organic phase was decanted, extracted by means of petroleum ether, dried on calcium chloride and concentrated. After cooling 2 grams of phosphoric acid were added to the residue which was then gradually heated to 230° C. under 100 ml./Hg. The dihydropyran liberated then distilled off, and 77.9 grams of 6,6-diethyl-6-germano-undecane-1,11-diol, (C$_2$H$_5$)$_2$Ge[(CH$_2$)$_5$OH]$_2$ were recovered. B.P.$_{.0.05\text{ mm.}}$=165° C. Yield 85%.

A mixture of 51 grams (0.167 mole) of said diol and 190 grams of 48% hydrobromic acid was heated and stirred for 4 hours. After cooling, the organic phase was extracted with petroleum ether, dried and distilled. 47.9 grams of 6,6-diethyl-6-germano-1,11-dibromo-undecane, (C$_2$H$_5$)$_2$Ge[(CH$_2$)$_5$Br]$_2$ were recovered. B.P.$_{.1\text{ mm.}}$=169° C. Yield 66%.

A solution of magnesium organo compound was prepared with 2 grams of ethyl bromide, 12 grams (0.566 mole) of pyranyl derivative of chlorohexanol and 15 grams (0.616 mole) of magnesium in 400 cc. of THF. 61.056 grams (0.210 mole) of dibromethylgermanium were added thereto and the mixture was heated under reflux for 5 hours after which the excess of magnesium compound was hydrolysed; the organic phase was decanted, dried on calcium chloride and concentrated. After cooling 2 grams of phosphoric acid were added and the residue was gradually heated to 230–240° C. under 100 ml./Hg. After elimination of the dihydropyran 56.5 grams of 7,7-diethyl-7-germano-tridecane-1,13-diol, (C$_2$H$_5$)$_2$Ge[(CH$_2$)$_6$OH]$_2$ were recovered by distillation: B.P.$_{.0.35\text{ mm.}}$=173° C. Yield 81%.

A mixture of 56 grams (0.168 mole) of the above obtained diol and 190 grams of 48% hydrobromic acid was heated and stirred for 4 hours. After cooling, the organic phase was extracted with petroleum ether, dried and distilled. 52.6 grams of 7,7 diethyl-7-germano-1,13-di-bromo-tridecane, (C$_2$H$_5$)$_2$Ge[(CH$_2$)$_6$Br]$_2$ compound were recovered: B.P.$_{.0.35\text{ mm.}}$=171° C. Yield 68%.

A mixture of 19.82 grams (0.043 mole) of the above dibromo compound, 9.85 grams of potassium cyanide, 13 cc. of water, 166 cc. of 95% of alcohol and 0.3 gram of cuprous chloride were caused to boil in a 500 cc. of flask equipped with a refrigerant. After cooling the mixture was filtered and the solvent expelled; the residue was extracted with chloroform. After distilling of the solvent, 13.6 grams of 7,7-diethyl-7-germano-1,13-dicyano-tridecane, (C$_2$H$_5$)$_2$Ge[(CH$_2$)$_6$CN]$_2$ were obtained: B.P.$_{.0.15\text{ mm.}}$=177° C. Yield 90%.

Starting from the dinitrile thus obtained, the corresponding diamine (C$_2$H$_5$)Ge[(CH$_2$)$_6$CH$_2$NH$_2$]$_2$ and diacid (C$_2$H$_5$)$_2$Ge[(CH$_2$)$_6$COOH]$_2$ were prepared, whereafter equimolecular quantities of said diamine and diacid were heated together at a temperature of 200° C. for 3 hours. A germano-organic compound was obtained, having the following formula:

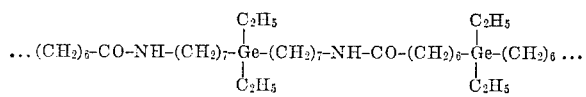

EXAMPLE 5

39.23 grams (0.184 mole) of dibutyldichlorosilane were slowly added to a solution of magnesium organo compound prepared by starting from 2 grams of ethyl bromide, 102 grams (0.53 mole) of pyranyl derivative of chlorobutanol and 14 grams (0.58 mole) of magnesium in 400 cc. of THF. The mixture was heated under reflux during 10 hours and the excess of magnesium compound was hydrolysed. The organic phase was decanted, dried and concentrated. After cooling 3 grams of phosphoric acid were added to the residue which was gradually heated under partial vacuum until all the dihydropyran was expelled. By distillation, 29.3 grams of 5,5-dibutyl-5-sila-nonane-1,9-diol, $(C_4H_9)_2Si[(CH_2)_4OH]_2$ were obtained: $B.P._{0.1}=152°$ C. Yield 55%.

The diol thus obtained was converted to 5,5-dibutyl-5-sila-1,11-dibromo-nonane, and therefrom successively to the corresponding diamine $(C_4H_9)_2Si[(CH_2)_4CH_2NH_2]_2$ and diacid $(C_4H_9)_2Si[(CH_2)_4COOH]_2$ by the same processes as in Example 2.

Equimolecular quantities of the said diamine and diacid were heated together at a temperature of about 200° C. for three hours, whereby the following silico-organic polyamide was obtained:

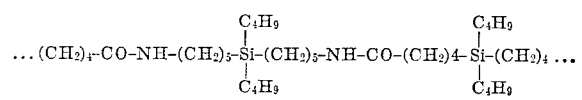

EXAMPLE 6

48.7 grams (0.13 mole) of diamyldibromogermane were added dropwise to a solution of magnesium compound prepared by starting from 2 grams of ethyl bromide, 73.2 grams (0.38 mole) of pyranyl derivatives of chlorobutanol and 10 grams (0.42 mole) of magnesium in 350 cc. of THF. The mixture was heated under reflux during 8 hours. After cooling the excess of magnesium compound was hydrolysed, the organic phase was decanted, dried and concentrated. The residue was treated by 2 grams of phosphoric acid then heated under partial vacuum (100 ml./Hg) until all the dihydropyran was expelled. By distillation 37.5 grams of 5,5-diamyl-5-germano-nonane-1,9-diol, $(C_5H_{11})_2Ge[(CH_2)_4OH]_2$ were obtained: $B.P._{0.08\ ml./Hg}=170°$ C. Yield 80%.

By the same processes as in Example 1, this diol was successively converted to the corresponding dibromo compound, dinitrile, diamine and diacid.

Equimolecular quantities of the diamine

and diacid $(C_2H_5)_2Ge[(CH_2)_4COOH]$ were heated together at a temperature of 200° C. for 3 hours, whereby the following germano-organic polyamine was obtained:

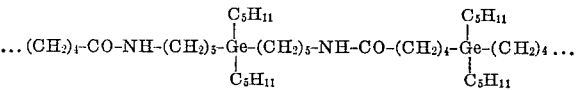

It clearly appears from the above examples that the nature of the radicals R or R' has no influence on the final result obtained and that said radicals could also be unsaturated or branched chain radicals.

Mixed germano-silico-organic polyamines may also be obtained, and also polyamides in which R and R' are different, as illustrated by the following example.

EXAMPLE 7

Equimolecular quantities of the diamine

obtained according to the Example 3 and of the diacid $(C_4H_9)_2Si[(CH_2)_4COOH]_2$ were heated together at a temperature of 200° C. during 3 hours. A polyamide comprising portions of the following formula was obtained:

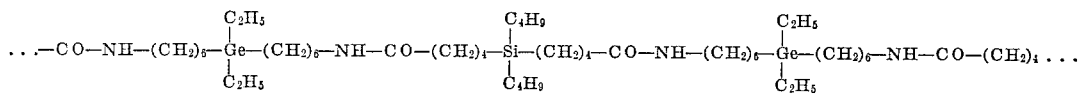

I claim:
1. A linear organometallic polyamide containing the recurring structural units:

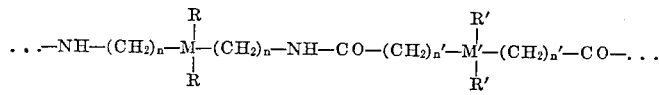

wherein:
each of $n$ and $n'$ is, independently, a number greater than 3;
each of R and R' is, independently, a saturated, unsaturated or branched chain;
each of M and M' is, independently, silicon or germanium or, alternatively, one of $-M(R)_2-$ and $-M'(R')_2$ is $-CH_2-$.

2. A polyamide according to claim 1 wherein each of R and R' is an alkyl having from 1 to 5 carbon atoms, each of $n$ and $n'$ is, independently, one of the numbers from the group consisting of silicon and germanium, and each of $n$ and $n'$ is, independently, one of the numbers 4, 5, 6 and 7.

3. A polyamide according to claim 2 wherein $n$ is 5, 6 or 7.

4. A polyamide according to claim 2 wherein 5 carbon atoms and $n'$ is 4, 5 or 6.

5. An organometallic polyamide according to claim 1 wherein each of M and M' is Ge.

6. The polyamide of the recurring unit formula
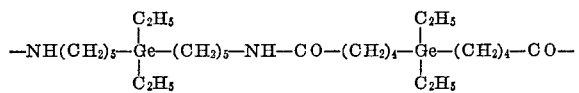
7. The polyamide of the recurring unit formula
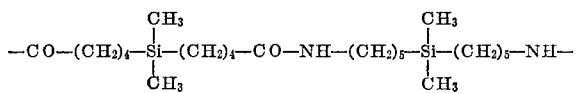
References Cited
UNITED STATES PATENTS
| 3,392,143 | 7/1968 | Holub | 260—78 |
| 2,628,244 | 2/1953 | Speier | 260—78 |
| 2,722,524 | 11/1955 | Speck | 260—78 |
| 2,754,284 | 7/1956 | Speck | 260—78 |
| 2,913,433 | 11/1959 | Wittbecker | 260—78 |
| 3,247,167 | 4/1966 | Jason et al. | 260—78 |
FOREIGN PATENTS
916,260  1/1963  Great Britain.
HAROLD D. ANDERSON, Primary Examiner
U.S. Cl. X.R.
260—429, 448.2

UNITED STATES PATENT OFFICE
CERTIFICATE OF CORRECTION

Patent No. 3,485,803  Dated December 23, 1969

Inventor(s) Pierre Mazerolles

It is certified that error appears in the above-identified patent and that said Letters Patent are hereby corrected as shown below:

Column 10, Claim 4, lines 72 and 73, cancel "5 carbon atoms and".

SIGNED AND
SEALED
MAY 12 1970

(SEAL)
Attest:

Edward M. Fletcher, Jr.
Attesting Officer

WILLIAM E. SCHUYLER, JR.
Commissioner of Patents